United States Patent
Roese et al.

(10) Patent No.: US 9,994,318 B2
(45) Date of Patent: Jun. 12, 2018

(54) SLEEPING BOX, SLEEPING BOX ARRANGEMENT AND AIRCRAFT AREA

(71) Applicant: AIRBUS OPERATIONS GMBH, Hamburg (DE)

(72) Inventors: Frank Roese, Hamburg (DE); Carsten Putensen, Hamburg (DE)

(73) Assignee: Airbus Operations GmbH, Hamburg (DE)

(*) Notice: Subject to any disclaimer, the term of this patent is extended or adjusted under 35 U.S.C. 154(b) by 70 days.

(21) Appl. No.: 14/661,677

(22) Filed: Mar. 18, 2015

(65) Prior Publication Data
US 2015/0266581 A1 Sep. 24, 2015

(30) Foreign Application Priority Data
Mar. 19, 2014 (DE) .......... 10 2014 205 106

(51) Int. Cl.
*B64D 11/00* (2006.01)

(52) U.S. Cl.
CPC .......... *B64D 11/0015* (2013.01); *B64D 11/00* (2013.01); *B64D 2011/0046* (2013.01); *B64D 2011/0069* (2013.01)

(58) Field of Classification Search
CPC .............. B64D 11/0015; B64D 11/00; B64D 2011/0046; B64D 2011/0069
See application file for complete search history.

(56) References Cited

U.S. PATENT DOCUMENTS

| | | | | |
|---|---|---|---|---|
| 4,071,210 A | * | 1/1978 | Mutke | B60N 2/34 105/314 |
| 4,594,817 A | * | 6/1986 | McLaren | A47C 19/20 5/2.1 |
| 6,056,239 A | * | 5/2000 | Cantu | B64D 11/06 244/118.5 |
| 6,152,400 A | * | 11/2000 | Sankrithi | B64D 11/00 105/315 |

(Continued)

FOREIGN PATENT DOCUMENTS

| | | |
|---|---|---|
| DE | 698 29 445 | 2/2006 |
| EP | 0 035 955 | 9/1981 |
| FR | 2 903 663 | 1/2008 |

(Continued)

OTHER PUBLICATIONS

German Search Report for Application No. 10 2014 205 106.1 dated Mar. 19, 2014.

*Primary Examiner* — Justin M Benedik
(74) *Attorney, Agent, or Firm* — Jenkins, Wilson, Taylor & Hunt, P.A.

(57) ABSTRACT

A sleeping box for installation in an aircraft comprises a casing which is suitable for accommodating a person located in a reclining position parallel to a longitudinal axis of the casing and which has an access aperture in the area of a front side which extends perpendicularly to the longitudinal axis of the casing. The sleeping box also comprises a fastening apparatus which is configured to fasten the sleeping box within a passenger cabin of the aircraft in such a way that the longitudinal axis of the casing extends perpendicularly to a longitudinal axis of the passenger cabin and the access aperture of the casing borders on an aisle which is present within the passenger cabin.

15 Claims, 12 Drawing Sheets

(56) References Cited

U.S. PATENT DOCUMENTS

| | | | | |
|---|---|---|---|---|
| 7,699,264 B2* | 4/2010 | Guering | ............... | B64D 11/00 105/315 |
| 2010/0065682 A1* | 3/2010 | Sorensen | ............... | B64D 11/06 244/118.5 |

FOREIGN PATENT DOCUMENTS

| WO | WO 2007/013164 | 2/2007 |
|---|---|---|
| WO | WO 2008/006955 | 1/2008 |

* cited by examiner

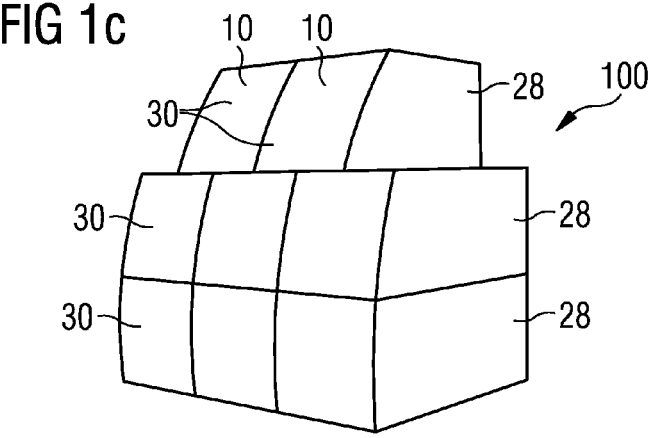
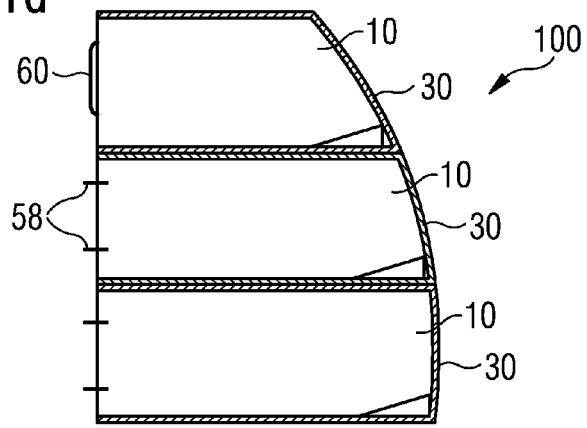
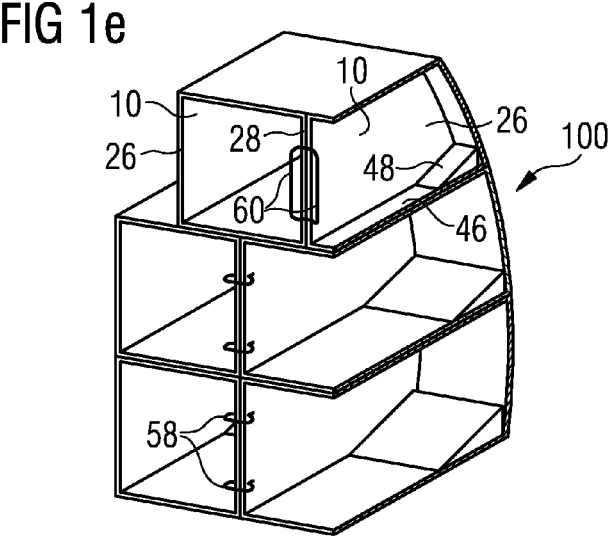

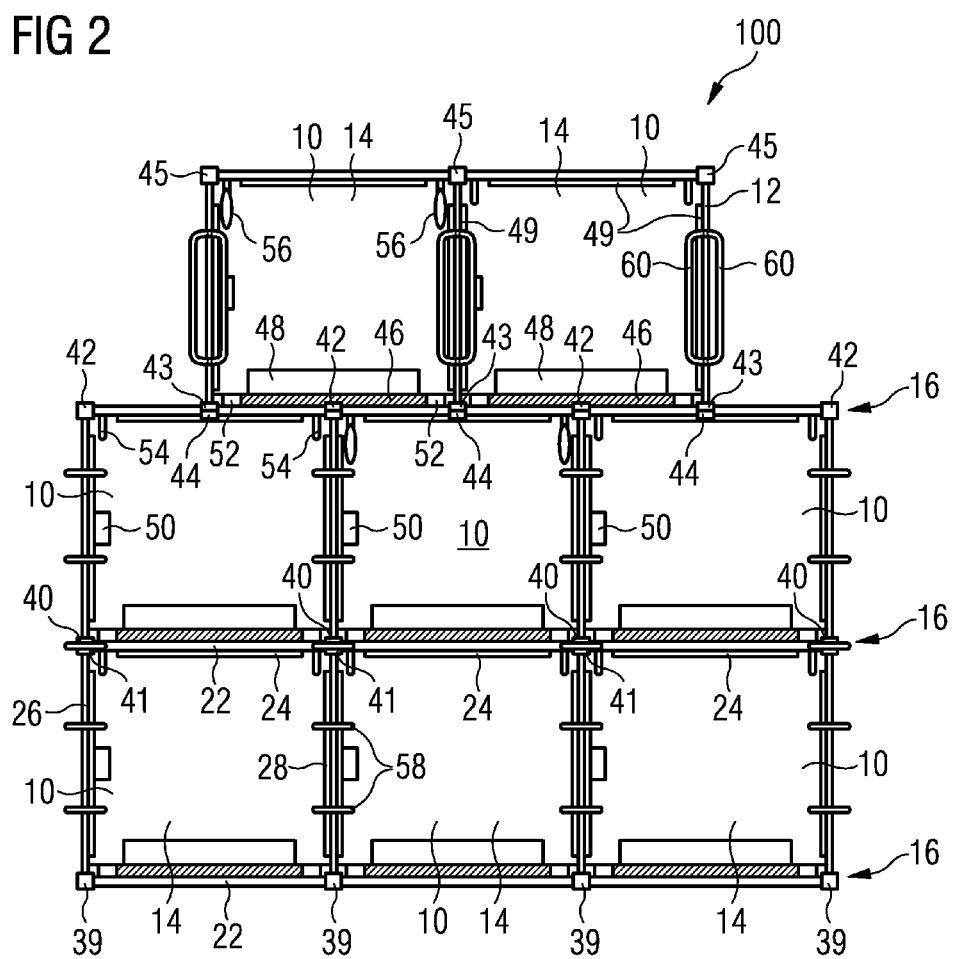

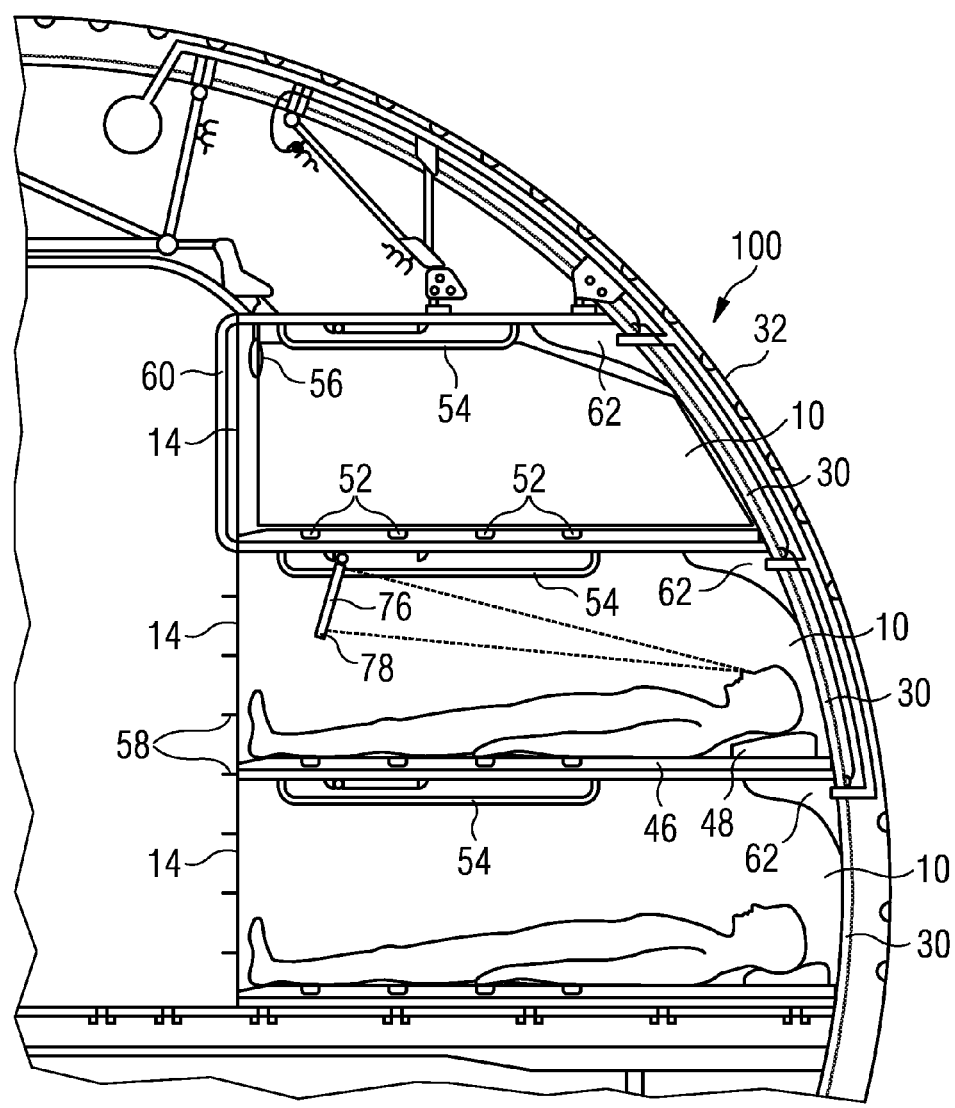

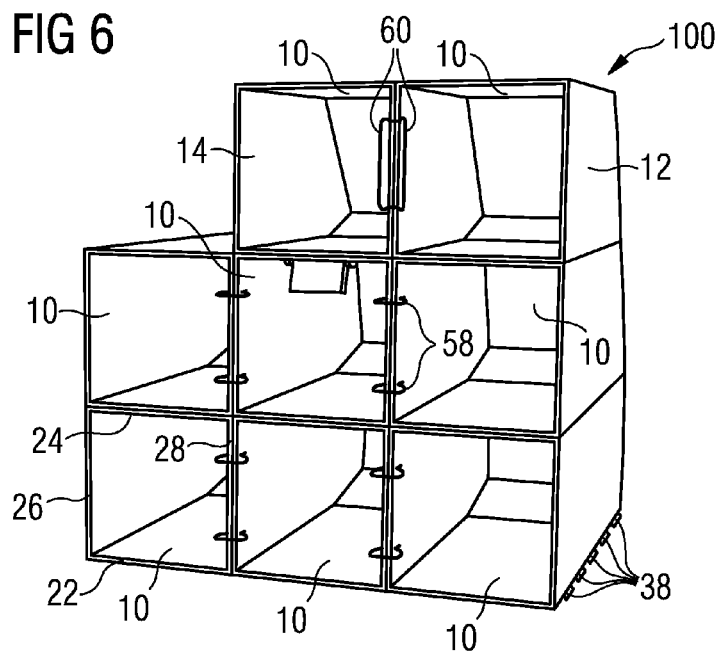
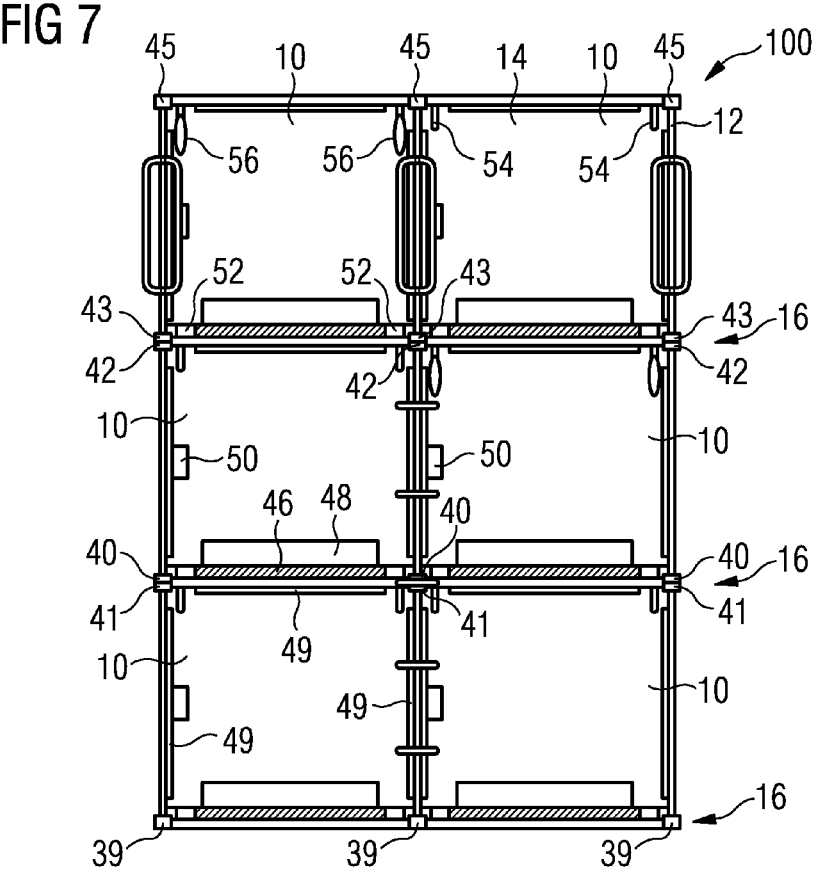

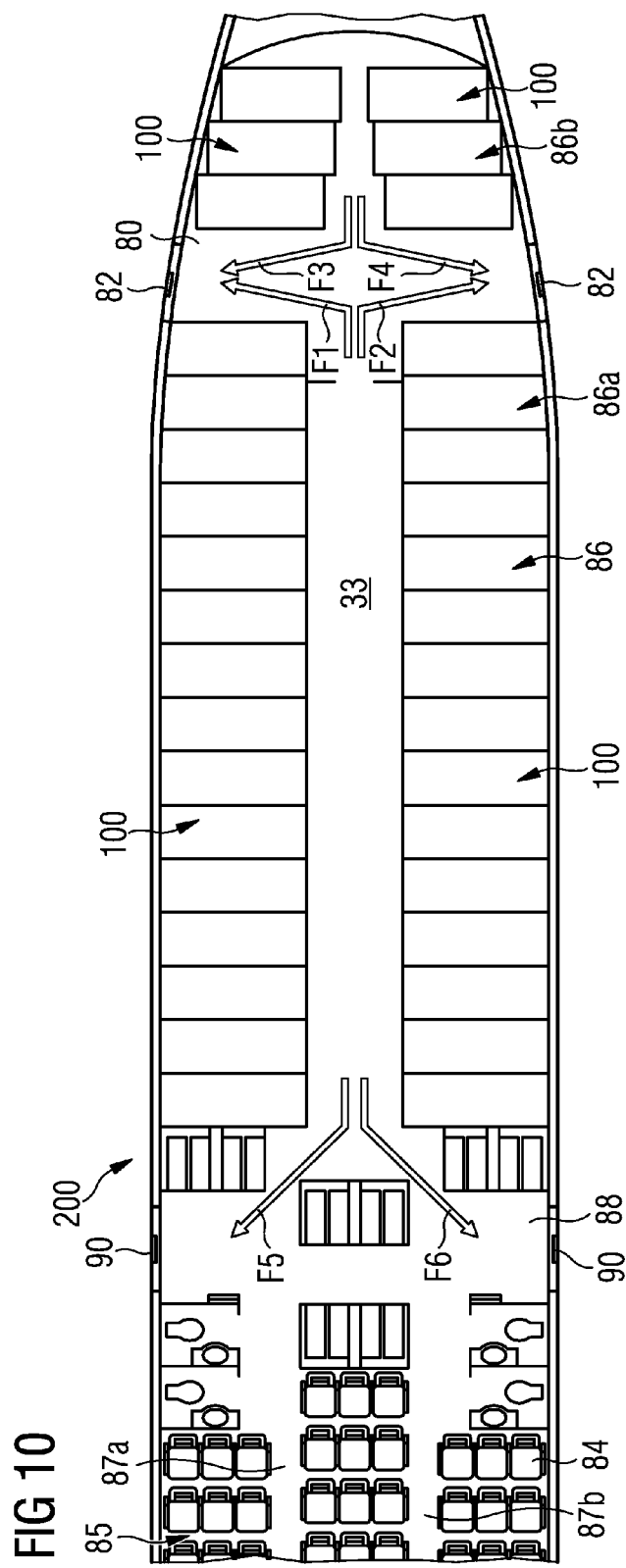

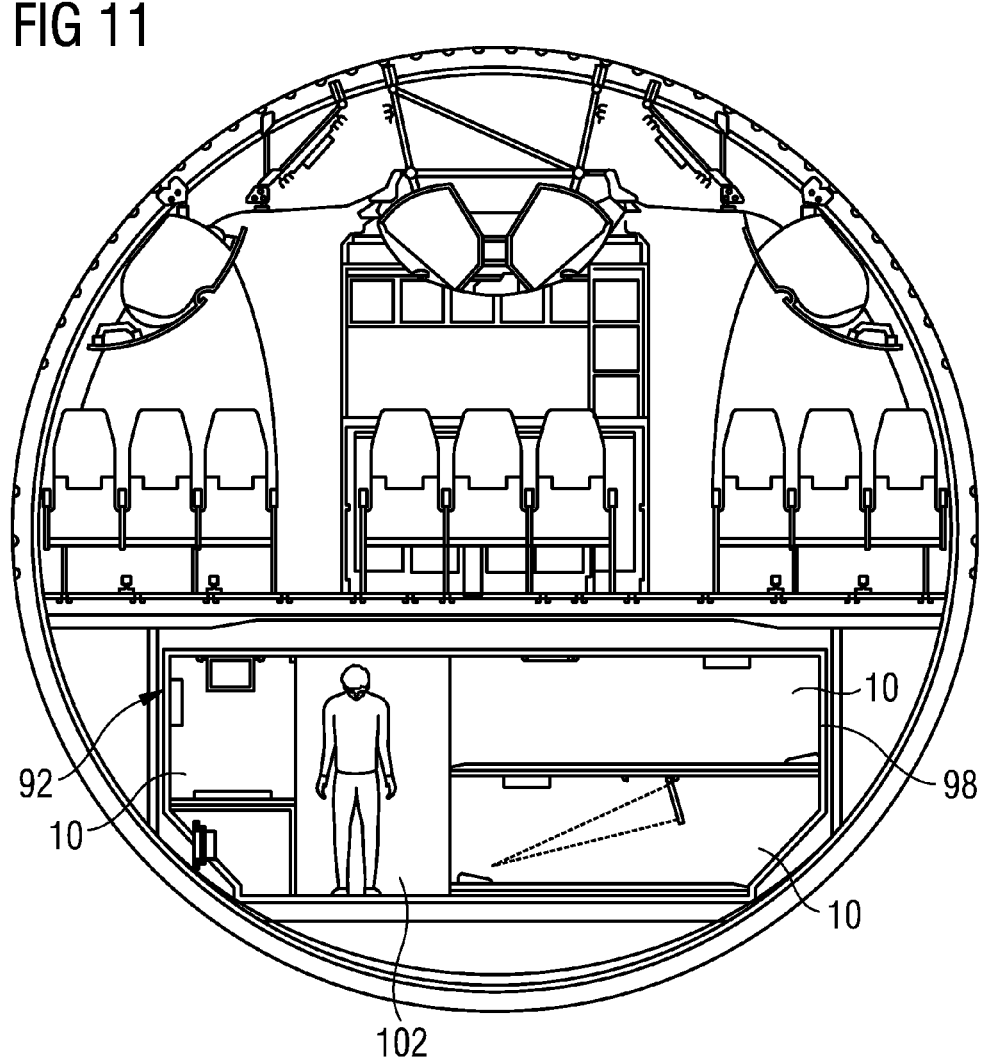

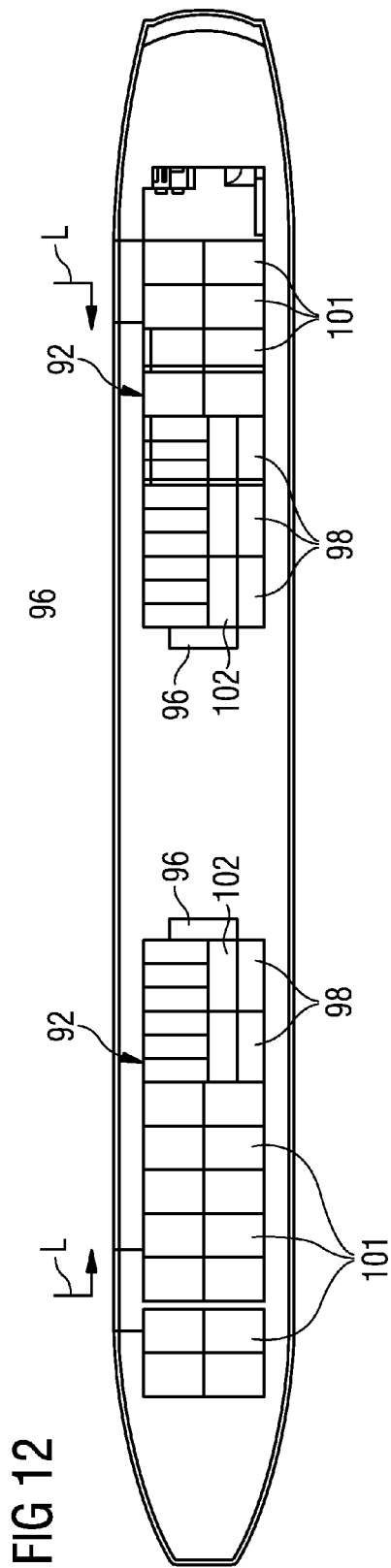

SLEEPING BOX, SLEEPING BOX ARRANGEMENT AND AIRCRAFT AREA

CROSS-REFERENCE TO RELATED APPLICATION

This application claims priority to DE 10 2014 205 106.1 filed Mar. 19, 2014, the entire disclosure of which is incorporated by reference herein.

TECHNICAL FIELD

The disclosure herein relates to a sleeping box which is intended for installation in an aircraft, and also to a sleeping box arrangement which comprises a plurality of such sleeping boxes. The disclosure herein also relates to an aircraft area which is equipped with such a sleeping box and/or such a sleeping box arrangement.

BACKGROUND

A passenger cabin of a modern commercial aircraft is normally equipped only in first class or business class with seats which can be brought into a horizontal position and thereby enable the passengers to sleep in a comfortable position. However these seats require a lot of installation space. Seats which are set up in economy class, on the other hand, are very economical on installation space, but the backrests of these seats are only movable to a limited extent and therefore can be found by the passengers to be uncomfortable, particularly on long-haul flights.

From EP 0 035 955 A2, it is known practice to configure a freight container, which is intended to be transported in a freight compartment of an aircraft, as a sleeping cabin with a bed. The freight container is lifted via a freight hatch into the freight compartment and is moved within the latter, via roller tracks provided in the floor of the freight compartment, to its station, where it is anchored in a detachable manner. Safety belts are associated with the bed in order to offer users of the sleeping cabin sufficient seating safety when the aircraft takes off and lands. In order to get to the sleeping cabins, passengers are obliged to leave a passenger compartment of the aircraft which is fitted with seats, and pass into the freight compartment through a bulkhead provided in a wall that separates the passenger compartment from the freight compartment.

FR 2 903 663 B1 or U.S. Pat. No. 7,699,264 B2 discloses a sleeping module which serves as a rest compartment for the crew of an aircraft and comprises two rows of three sleeping boxes each, arranged one above another, and which is intended for installation in a tail area of the aircraft which is accessible from a passenger cabin.

SUMMARY

An object of the disclosure herein is to make available a sleeping box which improves passenger comfort on board a commercial aircraft and is efficient in terms of installation space, as well as a sleeping box arrangement which comprises a plurality of such sleeping boxes. A further object of the disclosure herein is also to indicate an aircraft area which is equipped with a sleeping box and/or such a sleeping box arrangement.

These and other objects are achieved, at least in part or whole, by a sleeping box having the features disclosed herein.

A sleeping box which is suitable for installation in an aircraft comprises a casing which is suitable for accommodating a person located in a reclining position parallel to a longitudinal axis of the casing. The casing has an access aperture in the area of a front side which extends perpendicularly to the longitudinal axis of the casing. If desired, the access aperture may be closable by a door. However the casing is preferably not provided with an access aperture that can be closed off. The access aperture may extend over the entire front side of the casing. As an alternative to this, however, the access aperture may also take up only a section of the front side of the casing. What is essential, however, is that the access aperture is sufficiently large to permit a person access into the interior space of the sleeping box, or to allow a person to move out of the interior space of the sleeping box again.

The sleeping box also comprises a fastening apparatus which is configured to fasten the sleeping box within a passenger cabin of the aircraft in such a way that the longitudinal axis of the casing extends perpendicularly to a longitudinal axis of the passenger cabin and the access aperture of the casing borders on an aisle which is present in the passenger cabin. The fastening apparatus consequently positions the sleeping box within the passenger cabin of the aircraft in such a way that a person who is accommodated in the sleeping box lies perpendicularly to the direction of flight of the aircraft and is consequently pressed flat against a side wall of the casing of the sleeping box in the event of a crash or other action. It is thereby possible to achieve a favorable distribution of the loads acting upon the person's body, as a result of which the risk of injury to the person is reduced.

The geometry of the sleeping box is preferably designed in such a way that the passenger only has the possibility of lying in the sleeping box perpendicularly to the direction of flight of the aircraft. It is thus ensured, by suitable configuration of the cross-section of the sleeping box, that the passenger is lying stretched out perpendicularly to the direction of flight of the aircraft in the event of a crash or other action.

The sleeping box can consequently be installed in the passenger cabin of the aircraft by the fastening apparatus in such a way that it can be occupied even during the taxiing, takeoff and landing of the aircraft. It is thereby possible to dispense with making an additional seat available, in the passenger cabin of the aircraft, for a passenger who is occupying the sleeping box. Also, passengers are not obliged, as in the solutions which are known from the prior art, to leave the passenger cabin in order to get to the sleeping box. The sleeping box consequently provides a possibility, which makes particularly efficient use of the installation space which is available only to a very limited extent in the passenger cabin of an aircraft, of accommodating a passenger in a comfortable manner. Because of the efficient design of the sleeping box in terms of installation space, it is possible to offer, at a comparatively low price, a place in the sleeping box which offers a passenger a high degree of comfort and privacy, it being possible to install the sleeping box in the business class or economy class of the passenger cabin, as required. In addition, the sleeping box is particularly conveniently accessible to the passengers because of the configuration of its fastening apparatus which permits the mounting of the sleeping box in the passenger cabin of the aircraft such that the access aperture of the casing borders on an aisle.

The fastening apparatus of the sleeping box may be configured to fasten the sleeping box within a seat rail provided in a floor of the passenger cabin. For this purpose, the fastening apparatus may have, for example, a quick-action fastener which can be engaged in a latching manner within the seat rail. The sleeping box can then be installed particularly quickly and easily at a desired position in the passenger cabin. The sleeping box can also be repositioned in a simple manner in the course of a reconfiguration of the passenger cabin. Finally, a fastening apparatus which is configured to interact with a seat rail which is present, in any case, in the floor of the passenger cabin, makes it possible to dispense with an additional fastening apparatus on the aircraft.

In addition, or as an alternative, to this, the fastening apparatus may be configured to fasten the sleeping box to a further sleeping box such that a floor of the casing of the sleeping box borders on a ceiling of the casing of the further sleeping box. In other words, the fastening apparatus may be configured to connect two sleeping boxes which are stacked one above the other, to one another. The fastening apparatus may, in turn, have a latching fastener or quick-action fastener and be configured to interact with a fastening apparatus which is complementary to it and which is provided in the area of an outer face of the ceiling of the casing of the further sleeping box.

The fastening apparatus of the sleeping box may also be configured to connect the sleeping box to at least one further sleeping box in such a way that a side wall of the casing of the sleeping box borders on a side wall of the casing of the further sleeping box. The fastening apparatus of the sleeping box then additionally serves to connect sleeping boxes which are arranged side by side, and likewise preferably comprises a latching and/or quick-action fastener apparatus in order to permit quick and convenient connection of two sleeping boxes which are arranged side by side.

In its interior space, the sleeping box is preferably equipped with a reclining cushion which may be provided in the area of an inner face of the floor of the casing. A head cushion may also be provided which may be fastened to the inner face of the floor of the casing or to the reclining cushion which is provided in the area of the inner face of the floor of the casing. The sleeping box may also comprise at least one gripping recess which is formed in an inner face of the floor of the casing and/or of the side wall of the casing, which inner face faces towards an interior space of the sleeping box. A number of gripping recesses are preferably provided, which are formed in a row, one behind another, in the inner face of the floor of the casing and/or of the side wall of the casing which faces towards the interior space of the sleeping box. In one particularly preferred embodiment of the sleeping box, there are provided, in the inner face of the floor of the casing, two rows of gripping recesses which each extend parallel to the longitudinal axis of the casing in a manner adjacent to a side wall of the casing.

The sleeping box may also be equipped with at least one grip rail. The grip rail may extend parallel to the longitudinal axis of the casing. The grip rail may be fastened to an inner face of the ceiling of the casing and/or of the side wall of the casing, which inner face faces towards an interior space of the sleeping box. One preferred embodiment of the sleeping box is equipped with two grip rails which are each fastened to that inner face of the ceiling of the casing which faces towards the interior space of the sleeping box, and extend parallel to the longitudinal axis of the casing in a manner adjacent to the side walls of the casing.

The sleeping box may also comprise at least one gripping element which may be fastened to the inner face of the ceiling of the casing which faces towards the interior space of the sleeping box, and/or to the grip rail. The gripping element may be designed, for example, in the form of a gripping loop and consist of a plastic material. If desired, the gripping element may be fastened so as to be displaceable parallel to the longitudinal axis of the casing. For example the gripping element may be displaceable along a rail which may be attached to the inner face of the ceiling of the casing which faces towards the interior space of the sleeping box. As an alternative to this, however, the gripping element may also be fastened in a displaceable manner to a grip rail which extends parallel to the longitudinal axis of the casing and is mounted on the inner face of the ceiling of the casing or of the side wall of the casing. This makes it possible to dispense with additional components for mounting the gripping element. A sleeping box which is equipped with at least one gripping recess, at least one grip rail and/or at least one gripping element not only offers simplified access into the sleeping box but also permits quicker, easier and therefore safer evacuation of a person from the sleeping box.

In one preferred embodiment of the sleeping box, inner faces of the floor of the casing, of the ceiling of the casing, of a rear wall of the casing and/or of the side walls of the casing, which inner faces face towards the interior space of the casing, are padded, at least in certain sections, by cushioning. This considerably reduces the risk of injury to a passenger occupying the sleeping box in the event of a crash or other action or incident. In addition, it is then possible, if the inner faces of the casing of the sleeping box are configured in a padded manner, to dispense with providing the sleeping box with a safety belt.

In addition, or as an alternative, to this, the sleeping box may be equipped with an inflatable airbag which is configured to deploy in the direction of the interior space of the sleeping box if necessary. The airbag ensures further cushioning of the inner faces of the casing and thus makes it possible to further reduce the risk of injury to a passenger accommodated in the sleeping box in the event of a crash or other action or incident. The airbag should be designed in such a way that it permits, even in the deployed state, unimpeded evacuation of the passenger from the sleeping box. This can be guaranteed if the airbag is so dimensioned that it forms, in the deploying state, a gas-filled cushion about 5 to 10 cm thick which extends over at least part of the inner faces of the casing of the sleeping box. The airbag may be provided with a triggering mechanism which ensures deployment of the airbag when a predetermined acceleration acts upon the sleeping box. The acceleration acting upon the sleeping box may, for example, be measured by suitable acceleration sensors. As an alternative, or in addition, to this, it is also conceivable to equip the airbag with a triggering mechanism which can be activated by a signal which is inputted manually by a member of the cabin crew or the pilot. This activating signal may be transmitted, for example, by a cabin communication system of the aircraft.

Finally, the interior space of the sleeping box is preferably designed so as to be devoid of edges and corners in order to protect a passenger who is occupying the sleeping box from injuries. The casing of the sleeping box may comprise or consist of a plastic material or a fibre-reinforced plastic material. The sleeping box then has a low weight. The sleeping box is preferably so dimensioned and designed that it withstands crash loads of 16G.

The sleeping box may be equipped with a personal service unit which comprises a plurality of service modules. For example, the personal service unit of the sleeping box may comprise, in a manner similar to a conventional personal service unit which is arranged above the passenger seats in the passenger cabin of a commercial aircraft, an emergency oxygen system, a loudspeaker, an individual air outlet and a lamp. In addition, the personal service unit of the sleeping box is preferably equipped with a video camera which permits monitoring of the passenger accommodated in the sleeping box in certain operating phases of the aircraft. For example, the video camera may be activated during taxiing, takeoff and/or landing of the aircraft in order to enable the flight attendants to monitor the passenger in the sleeping box.

The loudspeaker provided in the personal service unit may be used, in the conventional manner, as an output unit of the cabin communication system. In addition, however, the loudspeaker may also be used to output an audible alarm signal to the passenger in the sleeping box, for example to wake the passenger for the takeoff or landing of the aircraft or in an emergency situation. The outputting of the audible alarm signal via the loudspeaker of the personal service unit of the sleeping box may be initiated, for example manually, by a member of the cabin crew or the pilot. In addition, the loudspeaker of the personal service unit may be used as an output unit of an active noise-reduction system. All that is necessary for this purpose is to connect the loudspeaker, preferably via the interface element, to a primary noise-reduction system of the aircraft.

The service modules of the personal service unit are preferably connectable via an interface element to corresponding aircraft systems for the purpose of supplying the service modules. For example, the loudspeaker provided in the personal service unit may be connectable via the interface to the cabin communication system. In a similar way, the individual air outlet of the personal service unit may be connectable via the interface to an individual air system of the aircraft. The emergency oxygen system may preferably be connectable via the interface to a central oxygen system of the aircraft. Finally it is possible, via the interface, to produce an electrical connection between electrical consumers belonging to the personal service unit and a central current supply system of the aircraft. The interface make it possible to bring the sleeping box into operation in a particularly simple manner since it permits a "plug and play" connection between the sleeping box and the primary supply systems of the aircraft. The interface is preferably arranged in the area of an outer face of the rear wall of the casing and can therefore be connected to the respective supply systems of the aircraft in a particularly simple and convenient manner when the sleeping box is installed in the passenger cabin.

The sleeping box may also comprise a display screen and/or an audio system which is connectable to an in-flight entertainment system of the aircraft. The connection between the display screen and/or audio system and the in-flight entertainment system of the aircraft is preferably produced via the same interface element that also ensures a connection of the service modules of the personal service unit to the corresponding supply systems of the aircraft.

A rear wall of the casing of the sleeping box, which rear wall lies opposite the access aperture, may have a curvature which is adapted to a curvature of a passenger cabin wall at an intended site of installation of the sleeping box in the passenger cabin. The sleeping box can then be mounted in the passenger cabin with optimum utilization of the installation space available in the passenger cabin. In an area adjacent to the access aperture, on the other hand, the casing of the sleeping box preferably has a square or rectangular cross-section.

A sleeping box arrangement comprises a plurality of the sleeping boxes described above. The sleeping boxes are arranged side by side and/or one above another, and are preferably connected to one another via the above-described fastening apparatuses or connecting apparatuses belonging to the sleeping boxes. If the fastening apparatuses and connecting apparatuses comprise, as described above, latching and/or quick-action fastener elements, particularly simple and rapid building-up of the sleeping box arrangement from a plurality of sleeping boxes is possible. A sleeping box arrangement which comprises a plurality of sleeping boxes arranged side by side and/or one above another forms a kind of honeycomb system which is distinguished by high load stability. This makes possible a lightweight design of the sleeping box arrangement.

The sleeping box arrangement may comprise at least one foothold and/or at least one handhold which is/are attached, in the area of the access aperture, to an edge of the floor of the casing, of the ceiling of the casing and/or of a side wall of the casing of at least one sleeping box. Such a configuration of the sleeping box arrangement permits convenient access, even into sleeping boxes belonging to the sleeping box arrangement which are situated high up.

Within the sleeping box arrangement, the sleeping boxes may be arranged in three rows, one above another. If the casing of each sleeping box belonging to the sleeping box arrangement has a cross-section of about 800 mm×800 mm in the area of the access aperture, a sleeping box arrangement with six sleeping boxes can then be installed in the economy class of the passenger cabin of the aircraft instead of three rows of seats. In the lower two rows of sleeping boxes belonging to the sleeping box arrangement, the side walls of the casing of sleeping boxes which are positioned one above another are preferably arranged so as to be coplanar in relation to one another. In contrast to this, the side walls of the casing of sleeping boxes which are positioned one above another in the upper rows are preferably arranged so as to be offset in relation to one another. An offset arrangement of the sleeping boxes in the third row of the sleeping box arrangement increases the stiffness of the honeycomb-like sleeping box arrangement. In addition, the sleeping boxes in the third row of the sleeping box arrangement are more conveniently and easily accessible if they are positioned so as to be offset in relation to the sleeping boxes located underneath them.

In a sleeping box arrangement that comprises a number of sleeping boxes, each sleeping box may, as described above, be equipped with an interface element which connects service modules of a personal service unit which are provided in the sleeping box and/or output units of an in-flight entertainment system, to the corresponding primary aircraft systems. As an alternative to this, however, it is also conceivable to provide a central interface element for connecting the complete sleeping box arrangement to the primary aircraft systems. The sleeping box arrangement is then equipped with corresponding distributor systems which ensure the connection of the individual sleeping boxes to the central interface element, and thereby to the primary aircraft systems.

Within the sleeping box arrangement, sleeping boxes which are arranged side by side in a row may have the same length. In contrast to this, sleeping boxes belonging to the sleeping box arrangement which are arranged one above another preferably have different lengths, the length of the sleeping boxes being, in particular, greater, the lower down the sleeping boxes are arranged within the sleeping box arrangement. As a result of such a configuration of the sleeping box arrangement, account is taken of the curved contour of the side wall of the passenger cabin at an intended site of installation of the sleeping box arrangement in the passenger cabin, and at the same time, optimum utilization of the installation space available is guaranteed.

An aircraft area comprises an aisle which extends along a longitudinal axis of a passenger cabin. The aircraft area is also equipped with at least one door aisle which extends perpendicularly to the longitudinal axis of the passenger cabin and connects the aisle to at least one aircraft door. Within the aircraft area, aircraft doors are preferably located at two mutually opposite ends of the door aisle. Also provided within the aircraft area is a sleeping box area in which at least one above-described sleeping box or at least one above-described sleeping box arrangement is arranged in such a way that the longitudinal axis of the casing of the sleeping box(es) extends perpendicularly to the longitudinal axis of the passenger cabin, and the access aperture of the casing of the sleeping box(es) borders on the aisle. The aircraft area consequently comprises a sleeping box area which is integrated into the passenger cabin and in which at least one sleeping box, which is conveniently accessible from the aisle of the aircraft area, is arranged.

The sleeping box area is preferably constituted by an area of the passenger cabin which is devoid of passenger seats and which extends over a predetermined length along the longitudinal axis of the passenger cabin. The predetermined length of the sleeping box area along the longitudinal axis of the passenger cabin may vary, according to requirements. For example, the sleeping box area may be enlarged or diminished in the context of an occupancy-initiated or seasonal reconfiguration of the passenger cabin of the aircraft. If the sleeping box area is constituted by an area of the passenger cabin which is devoid of passenger seats, it is guaranteed that, in an emergency, evacuation of the passengers from the sleeping boxes set up within the sleeping box area is not hindered by passengers who are sitting on passenger seats installed in the passenger cabin. Conversely, the evacuation of the passengers who are obliged to leave their passenger seats which are installed in rows in the passenger cabin is not disrupted by the passengers who are leaving the sleeping boxes. It is thereby possible to develop a separate evacuation scenario for the sleeping box area.

The sleeping box area is preferably connected, via at least one escape route which is not restricted by passenger seats, to at least one aircraft door. This guarantees an evacuation sequence which is further optimised, both for passengers who are occupying sleeping boxes installed in the sleeping box area of the aircraft area, and for passengers who are sitting on passenger seats.

The sleeping box area within the aircraft area preferably borders on the door aisle. This permits unimpeded access to the aircraft doors in the event of an evacuation of the sleeping box area. The door aisle adjacent to the sleeping box area is, in particular, a door aisle which is adjacent, on a side that lies opposite the sleeping box area, to an area of the aircraft devoid of passenger seats, and is consequently not frequented, in the event of an evacuation of the passenger cabin, by passengers who are sitting on passenger seats installed in the passenger cabin. The door aisle is therefore exclusively available, in an emergency, for an evacuation of the passengers from the sleeping box area.

The aircraft area preferably also comprises a freight compartment area which is connected to the passenger cabin via an access. There may be accommodated within the freight compartment area at least one freight container, in the interior space of which there is provided at least one sleeping box which is suitable for accommodating a person located in a reclining position parallel to a longitudinal axis of the sleeping box, and which has an access aperture in the area of a front side which extends perpendicularly to the longitudinal axis of the sleeping box. The freight container in question is preferably one which corresponds, as regards its shape and dimensioning, to a conventional freight container and which is consequently suitable for being accommodated in the freight area of the aircraft area.

The sleeping box provided within the freight container may, as described above, be equipped with at least one gripping recess, at least one grip rail and/or at least one gripping element. A padded configuration of the sleeping box and/or the equipping of the sleeping box with an airbag is also conceivable. The sleeping box may likewise comprise a personal service unit with a plurality of service modules, a display screen and/or an audio system. These systems can be connected to corresponding supply systems of the aircraft, preferably via a corresponding interface element which may be arranged in the area of an outer face of the freight container.

The freight container within which the at least one sleeping box is accommodated, is preferably of gastight design in order to permit the use of fire-extinguishing means within the freight compartment area in the event of a fire. A number of freight containers, within the interior space of which at least one sleeping box is provided, are preferably connected to one another by an aisle. An aisle of this kind, which is provided between mutually opposite or mutually adjacent sleeping boxes, should likewise be of correspondingly gastight design. If mutually adjacent freight containers are connected to one another by an aisle, passengers can enter a first freight container, which lies closest to the passenger cabin, and then move through the aisle to the adjacent freight containers. The aisle may be closable at one end or at both ends by a door. The freight containers, which are arranged in a row, may also be provided with corresponding doors.

The freight compartment area may be loaded, in a utilization-dependent manner, with freight containers, within the interior space of which at least one sleeping box is provided, and with conventional freight containers. When the freight compartment area is being loaded, the freight containers within the interior space of which at least one sleeping box is provided, are preferably brought into the freight compartment area first so that, when the freight compartment area is completely loaded, they are then located in a rear area of the freight compartment area, that is to say one which is furthest away from a freight compartment door. This section of the freight compartment area may be connected, for example via a staircase or a door, to the passenger cabin, so that unimpeded access into the freight compartment area from the passenger cabin is possible. A section of the freight compartment area which lies closer to the freight compartment door may, on the other hand, be loaded with conventional freight containers, so that the loading and unloading of these containers is not hindered by the freight containers which are provided, in their interior space, with at least one sleeping box.

BRIEF DESCRIPTION OF THE DRAWINGS

Preferred forms of embodiment of the disclosure herein will now be explained in greater detail with the aid of the appended diagrammatic drawings, in which:

FIGS. 1a to 1e show a first embodiment of a sleeping box arrangement in a three-dimensional front view, a three-dimensional side view, a three-dimensional rear view, a sectional view and a three-dimensional sectional view;

FIG. 2 shows a diagrammatic detail representation of a sleeping box arrangement according to FIGS. 1a to 1c;

FIG. 4 shows a detail representation of the sleeping box arrangement in the condition in which it is mounted in the passenger cabin of an aircraft;

FIG. 6 shows an alternative embodiment of a sleeping box arrangement in a three-dimensional front view;

FIG. 7 shows a diagrammatic detail representation of a section of the sleeping box arrangement according to FIG. 6;

FIG. 10 shows yet another embodiment of an aircraft area equipped with a sleeping box area;

FIG. 11 shows an aircraft area with a freight compartment area within which there is accommodated a freight container, in the interior space of which a number of sleeping boxes are provided; and FIG. 12 illustrates the arrangement, within a freight compartment area, of freight containers which are provided with sleeping boxes in their interior space.

DETAILED DESCRIPTION

FIGS. 1a to 1e show a first embodiment of a sleeping box arrangement 100 which is suitable for installation in an aircraft. The sleeping box arrangement 100 comprises a plurality of sleeping boxes 10 which are arranged in three rows, one above another. The sleeping box arrangement 100 has a honeycomb-like structure which is distinguished by high mechanical stability and load-resistance. As a result of this, the sleeping box arrangement 100 can be of comparatively lightweight design. In any case, each sleeping box 10 belonging to the sleeping box arrangement 100 should withstand an impact load of 16G.

Figure 3:
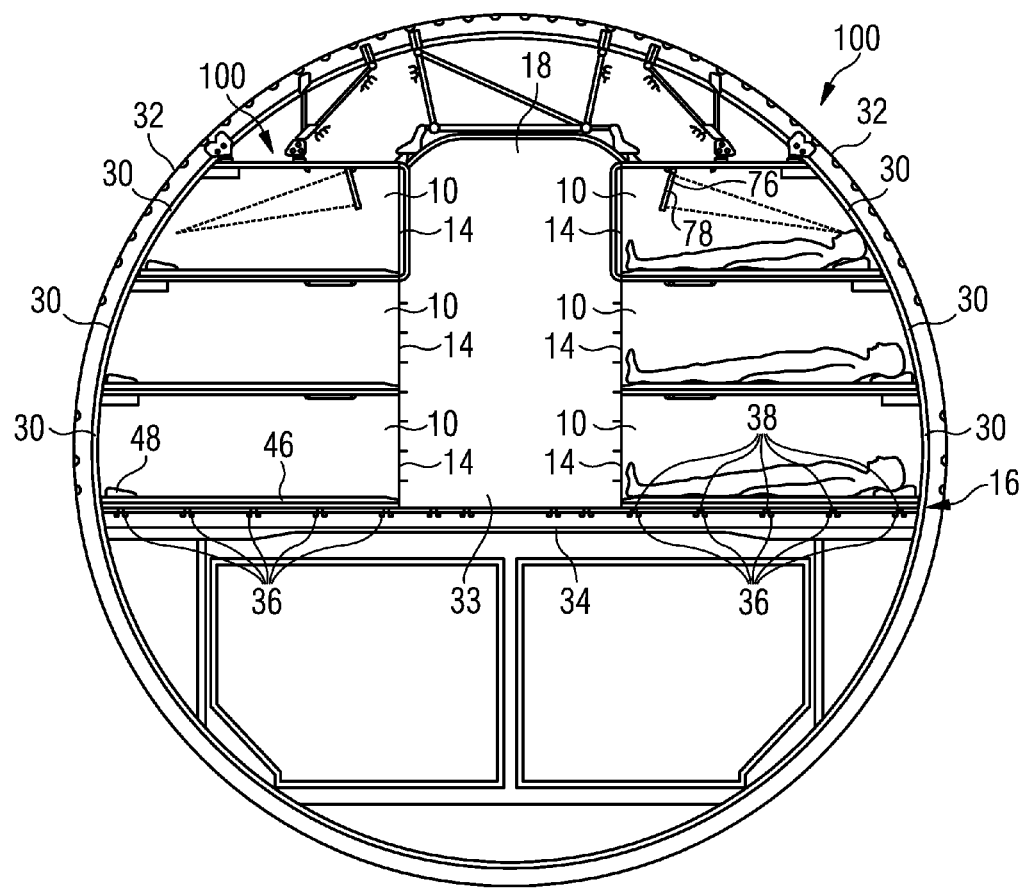
FIG. 3 shows the arrangement of second sleeping box arrangements according to FIGS. 1a to 1e in the passenger cabin of an aircraft.

Each sleeping box 10 has a casing 12 which is suitable for accommodating a person who is located in a reclining position parallel to a longitudinal axis $L_G$ of the casing 12. In the area of a front side, which extends perpendicularly to the longitudinal axis $L_G$ of the casing 12, each sleeping box 10 has an access aperture 14. Each sleeping box 10 is provided with a fastening apparatus 16 which is configured to fasten the sleeping box 10 within a passenger cabin 18 of the aircraft, see FIG. 3.

The casing 12 of each sleeping box 10 comprises a floor 22 of the casing, a ceiling 24 of the casing which lies opposite the floor 22 of the casing, two mutually opposite side walls 26, 28 of the casing and a rear wall 30 of the casing. In the area of the access aperture 14, the casing 12 of each sleeping box 10 has a square cross-section and dimensions of 800 mm×800 mm, in order to facilitate access into an interior space of the sleeping box 10. The rear wall 30 of the casing, however, is of curved design, see in particular FIGS. 1b, 1c, 1d, 1e, 3 and 4, the curvature of the rear wall 30 of the casing being adapted to a curvature of a wall 32 of the passenger cabin at an intended site of installation of the sleeping box arrangement 100 and consequently of each sleeping box 10 within the passenger cabin 18. As a result of this, optimum utilization of the installation space available within the passenger cabin 18 is guaranteed when the sleeping box arrangement 100 is installed in the passenger cabin 18.

The fastening apparatus 16 is configured to fasten the sleeping box 10 within the passenger cabin 18 in such a way that the longitudinal axis $L_G$ of the casing 12 of the sleeping box 10 extends perpendicularly to a longitudinal axis $L_P$ of the passenger cabin 18, the access aperture 14 of the casing 12 bordering on an aisle 33 which is present in the passenger cabin 18. The sleeping boxes 10 of the sleeping box arrangement 100 are consequently conveniently accessible to passengers from the aisle 33. In addition, the orientation of the sleeping boxes 10 relative to the longitudinal axis $L_P$ of the passenger cabin 18 guarantees that the persons occupying sleeping boxes 10 belonging to the sleeping box arrangement 100 lie perpendicularly to the longitudinal axis $L_P$ of the passenger cabin 18 and consequently perpendicularly to the direction of flight of the aircraft. In the event of a crash or other action or incident, persons who are lying in the sleeping boxes 10 are consequently pressed flat against one of the side walls 26, 28 of the casing. Under these circumstances, the load acting upon the person's body is distributed uniformly over the entire body, as a result of which the risk of injury can be minimised. The sleeping boxes 10 of the sleeping box arrangement 100 may consequently remain occupied even during taxiing, takeoff and landing of the aircraft, so that it is not necessary to provide additional seats in the passenger cabin 18 for passengers who are occupying the sleeping boxes 10.

As an alternative to this, however, scenarios for using the sleeping box arrangement 100 are also conceivable in which passengers book both a seat and a place in one of the sleeping boxes 10. These passengers have the possibility of occupying their seat or their sleeping box 10, according to their choice. In particular, they are able to go to their sleeping box 10 in order to sleep, whereas meals and beverages can be consumed while sitting down. A booking scenario can also be imagined in which two passengers share a seat and a sleeping box 10 and occupy the seat and the sleeping box 10 alternately.

The design of the fastening apparatus 16 of each sleeping box 10, which fastens the sleeping box 10 in the desired position within the passenger cabin 18, is adapted to the position of the sleeping box 10 within the sleeping box arrangement 100. Sleeping boxes 10 which are arranged in the bottommost row of the sleeping box arrangement 100 each have a fastening apparatus 16 which is configured to fasten the sleeping box 10 to seat rails 36 provided in a floor 34 of the passenger cabin 18. As can be seen particularly from FIGS. 1b and 3, each of the sleeping boxes 10 located in the bottommost row of the sleeping box arrangement 100 is provided with five latching or quick-action fastener elements 38 which are set up for the purpose of latching engagement, in each case, with one of the seat rails 36 which are let into the floor 34 of the passenger cabin 18 and extend parallel to the longitudinal axis $L_P$ of the passenger cabin 18. The quick-action fastener elements 38 are provided in the area of an outer face of the floor 22 of the casing and permit, not only particularly quick and easy mounting of the sleeping box arrangement 100 within the passenger cabin 18, but also, for example in the event of a reconfiguration of the passenger cabin 18, easy and convenient repositioning of the sleeping box arrangement 100.

The fastening apparatus of the sleeping boxes 10 which are arranged in the bottommost row of the sleeping box arrangement 100 is also configured to connect the sleeping box 10 to at least one other sleeping box 10 in such a way that a side wall 26, 28 of the casing of the sleeping box 10 borders on a side wall 26, 28 of the casing of the other sleeping box 10. For this purpose, the fastening apparatus 16 is provided with quick-action fastener elements 39 which are illustrated in FIG. 2 and which are each attached to connecting edges between the side walls 26, 28 of the casing and the floors 22 of the casing of the sleeping boxes 10.

In contrast to this, the sleeping boxes 10 which are positioned in the middle row of the sleeping box arrangement 100 are each provided with a fastening apparatus 16 which serves to fasten the sleeping box 10 to another sleeping box 10, which is located underneath it, belonging to the sleeping box arrangement 100, in such a way that a floor 22 of the casing of the upper sleeping box 10 borders on a ceiling 24 of the casing of a sleeping box 10 which is located underneath it. This fastening apparatus 16 comprises quick-action fastener elements 40 which are attached to connecting edges between the side walls 26, 28 of the casing and the floors 22 of the casing or ceilings 24 of the casing of the sleeping boxes 10 and which interact with complementary quick-action fastener elements 41 which are attached to connecting edges between the side walls 26, 28 of the casing and the ceilings 24 of the casing of the sleeping boxes 10 in the bottommost row of the sleeping box arrangement 100. The quick-action fastener elements 40 of the sleeping boxes 10 in the middle row also serve for connecting sleeping boxes 10 which are laterally adjacent to one another in the middle row. In the same way, the quick-action fastener elements 41 of the sleeping boxes 10 in the bottommost row also fulfil the double function of, on the one hand, ensuring the fastening of a sleeping box 10 in the middle row to a sleeping box 10 in the bottommost row and, on the other hand, connecting two sleeping boxes 10 in the bottommost row, which are laterally adjacent to one another, to one another. The fastening apparatus 16 of the sleeping boxes 10 in the middle row of the sleeping box arrangement 100 also comprises quick-action fastener elements 42 which are attached to connecting edges between the side walls 26, 28 of the casing and the ceilings 24 of the casing of the sleeping boxes 10 in the middle row of the sleeping box arrangement 100. These quick-action fastener elements 42 serve to connect sleeping boxes 10 in the middle row which are laterally adjacent to one another.

Finally, the sleeping boxes 10 which are positioned in the uppermost row of the sleeping box arrangement 100 also each comprise a fastening apparatus 16 which serves to fasten the sleeping box 10 to another sleeping box 10, which is located underneath it, belonging to the sleeping box arrangement 100 in such a way that a floor 22 of the casing of the upper sleeping box 10 borders on a ceiling 24 of the casing of a sleeping box 10 which is located underneath it. This fastening apparatus 16 comprises quick-action fastener elements 43 which are attached in the area of the floors 22 of the casing of the sleeping boxes 10 and which interact with complementary quick-action fastener elements 44 which are attached in the area of the ceilings 24 of the casing of the sleeping boxes 10 in the middle row of the sleeping box arrangement 100. The quick-action fastener elements 43 of the sleeping boxes 10 in the uppermost row also serve to connect sleeping boxes 10 in the uppermost row which are laterally adjacent to one another. The fastening apparatus 16 of the sleeping boxes 10 in the uppermost row of the sleeping box arrangement 100 also comprises quick-action fastener elements 45 which are attached to connecting edges between the side walls 26, 28 of the casing and the ceilings 24 of the casing of the sleeping boxes 10 in the uppermost row of the sleeping box arrangement 100. These quick-action fastener elements 45 serve to connect sleeping boxes 10 in the uppermost row which are laterally adjacent to one another.

The interior space of each sleeping box 10 of the sleeping box arrangement 100 is equipped with a reclining cushion 46, which is provided in the area of an inner face of the floor 22 of the casing, and also with a head cushion 48. Inner faces of the ceiling 24 of the casing, of the side walls 26, 28 of the casing and of the rear wall 30 of the casing, which inner faces face towards the interior space of the sleeping box 10, are also padded by cushioning 49, as a result of which the risk of injury, in the event of a crash or other action or incident, to a person lying in the sleeping box 10 can be minimised. It is therefore possible to dispense with making a safety belt available within the sleeping boxes 10.

Figure 1A:
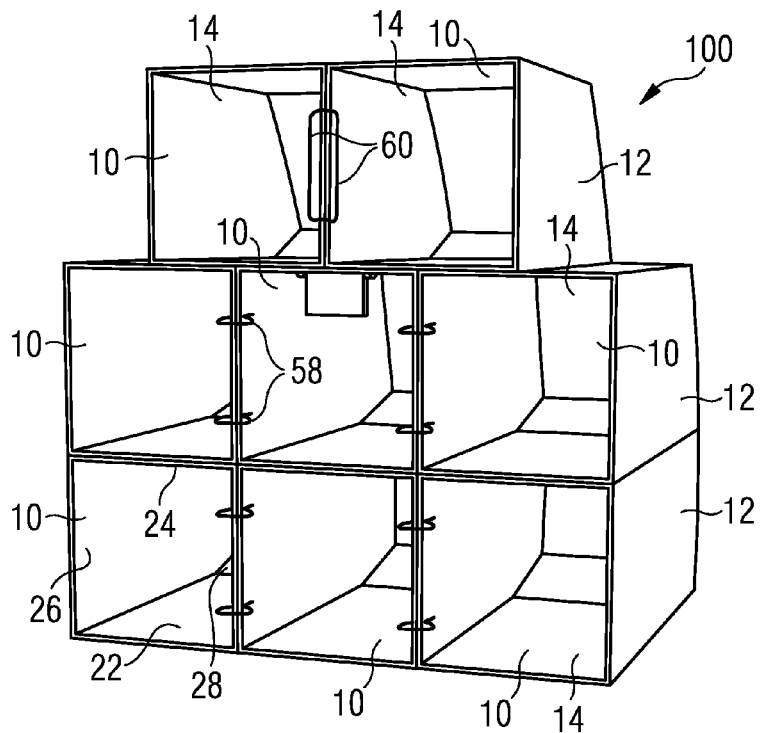
Figure 1B:
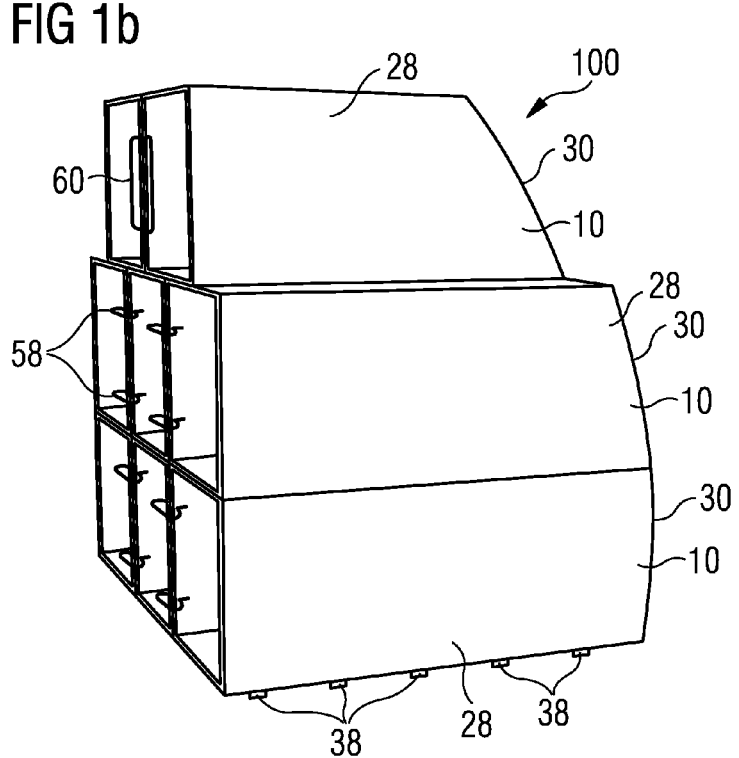

In order to further improve the safety, each sleeping box 10 is equipped with an airbag 50 which is indicated merely diagrammatically in FIG. 1a. The inflatable airbag 50 can be activated by a triggering mechanism, of which no further details are indicated, and is deployed in the direction of the interior space of the sleeping box 10 when the triggering mechanism is activated. However the airbag 50 is so dimensioned that it does not excessively restrict the volume of the interior space of the sleeping boxes 10. On the contrary, the airbag 50 merely forms a gas-filled cushion about 5 to 10 cm thick which extends over the inner faces of the ceiling 24 of the casing, of the side walls 26, 28 of the casing and of the rear wall 30 of the casing. Finally, the interior space of each sleeping box 10 is devoid of edges and corners.

As can best be seen in FIG. 4, each sleeping box 10 of the sleeping box arrangement 100 is provided with a plurality of gripping recesses 52 which are arranged, one behind another, along the longitudinal axis $L_G$ of the casing 12. The gripping recesses 52 are arranged in two rows and are let, in a manner adjacent to the side walls 26, 28 of the casing, into an inner face of the floor 22 of the casing, which inner face faces towards the interior space within the sleeping box 10. Each sleeping box 10 is also equipped with two grip rails 54 which are fastened, in a manner adjacent to the side walls 26, 28 of the casing, to an inner face of the ceiling 24 of the casing that faces towards the interior space of the sleeping box 10, and extend parallel to the longitudinal axis $L_G$ of the casing 12. Finally, two gripping elements 56, which are constructed in the form of a loop and are produced from a flexible plastic material, are provided in each of the sleeping boxes 10. The gripping elements 56 are mounted on an inner face of the ceiling 24 of the casing. The gripping recesses 52, grip rails 54 and gripping elements 56 make it easier to climb into the sleeping box, and in particular to climb out of the sleeping box 10, and can consequently considerably accelerate the evacuation of persons from the sleeping boxes 10.

As can best be seen in FIGS. 1a and 2, the sleeping box arrangement 100 is also equipped with a plurality of rungs 58 which are attached, one above another, to an edge of the side walls 26, 28 of the casing and also of the floors 22 of the casing and of the ceilings 24 of the casing in the area of the access apertures 14 of the sleeping boxes 10. Access into the sleeping boxes 10 located at the top in the sleeping box arrangement 100 is made possible for passengers via the rungs 58. In order to make it easier to climb into the sleeping boxes 10 in the uppermost row of the sleeping box arrangement 100, each sleeping box 10 in the uppermost row of the sleeping box arrangement 100 is also provided with a handhold 60 which is attached to an edge of the side walls 26, 28 of the casing of the sleeping boxes 10 in the area of the access aperture 14.

Within the sleeping box arrangement 100, sleeping boxes 10 which are arranged side by side in a row each have the same length. However sleeping boxes 10 which are arranged one above another have different lengths, the length of the sleeping boxes 10 in the sleeping box arrangement 100 being greater, the lower down the sleeping boxes 10 are arranged within the sleeping box arrangement 100, see in particular FIGS. 3 and 4. As a result of this configuration of the sleeping box arrangement 100, account is taken of the curved contour of the wall 32 of the passenger cabin at the desired site of installation of the sleeping box arrangement 100 within the passenger cabin 18.

The sleeping boxes 10 are also positioned, relative to one another, within the sleeping box arrangement 100 in such a way that side walls 26, 28 of the casing of sleeping boxes 10 which are positioned one above another in the lower two rows of sleeping boxes of the sleeping box arrangement 100 are arranged so as to be coplanar in relation to one another. In contrast to this, the side walls 26, 28 of the casing of sleeping boxes 10 which are positioned one above another in the upper two rows of sleeping boxes of the sleeping box arrangement 100 are arranged so as to be offset in relation to one another. In other words, the uppermost row of sleeping boxes is positioned so as to be offset relative to the lower two rows of sleeping boxes. As a result of this configuration of the sleeping box arrangement 100, the stability of the honeycomb-like sleeping box arrangement 100 is improved. It is also made easier to climb into the sleeping boxes 10 in the upper rows of the sleeping box arrangement 100.

Figure 5A:
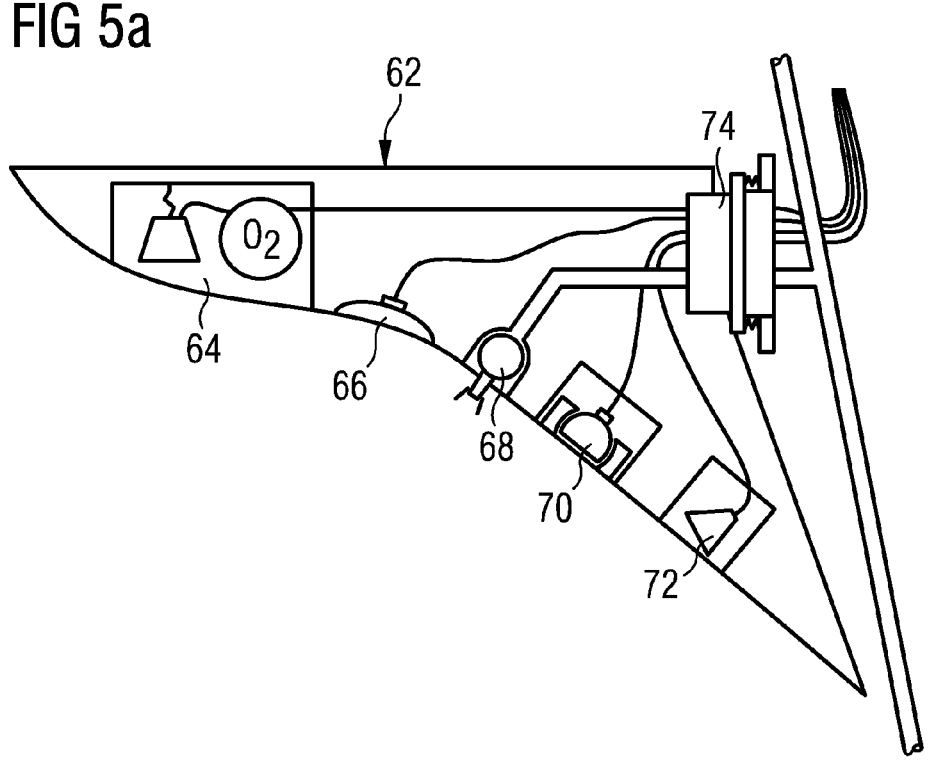
FIGS. 5a and 5b show a personal service unit and also an interface element of a sleeping box belonging to the sleeping box arrangement according to FIGS. 1a to 1e.
Figure 5B:
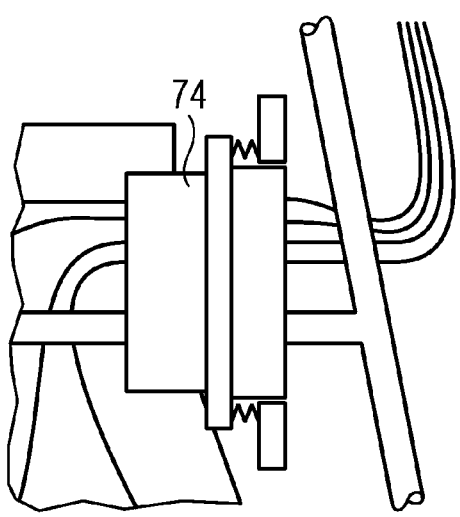

As can best be seen in FIGS. 4, 5a and 5b, each sleeping box 10 of the sleeping box arrangement 100 is also equipped with a personal service unit 62. Each personal service unit 62 comprises a plurality of service modules which, in the embodiment of a personal service unit 62 illustrated in FIG. 5a, is configured in the form of an emergency oxygen system 64, a loudspeaker 66, an individual air outlet 68, a lamp 70 and a video camera 72. The service modules 64, 66, 68, 70, 72 can be connected, via an interface element 74, to corresponding aircraft systems for supplying the service modules 64, 66, 68, 70, 72. In particular, the emergency oxygen system 64 is connected, via the interface element 74, to a central oxygen supply system of the aircraft. The loudspeaker 66 is connected to a cabin communication system and also to a noise-reduction system of the aircraft. In addition to conventional announcements, it is also possible to output audio signals via the loudspeaker 66, for example in order to wake a passenger lying in the sleeping box 10 for the takeoff or landing of the aircraft or in an emergency. The outputting of such an audio signal may be initiated manually by the crew members or the pilot. The loudspeaker may also be used as an output unit of an active noise-reduction system.

The individual air outlet 68 is connected, via the interface element 74, to a central individual air supply system of the aircraft, while the lamp 70 is supplied with electrical energy, via the interface element 74, by a central energy supply system of the aircraft. The video camera 72, too, is connected to the electrical supply system of the aircraft via the interface element 74. Moreover, the video camera 72 transmits video signals, via the interface element 74, to a central monitoring system of the aircraft which enables the cabin crew to monitor passengers lying in the sleeping boxes 10, particularly during the takeoff and landing of the aircraft and also when taxiing. Finally, each sleeping box 10 is equipped with a display screen 76. The display screen 76 has an integrated audio system 78 and can be connected, via the interface element 74, to an in-flight entertainment system of the aircraft.

In principle, each sleeping box 10 of the sleeping box arrangement 100 may be connected to the central supply systems of the aircraft via a separate interface element 74. As an alternative to this, however, a configuration of the sleeping box arrangement 100 with just one central interface element, which ensures the connection of all the sleeping boxes 10 of the sleeping box arrangement 100 to the central supply systems of the aircraft, is also conceivable.

The sleeping box arrangement 100 illustrated in FIGS. 6 and 7 differs from the configuration of the sleeping box arrangement 100 illustrated in FIGS. 1 to 5 through the fact that the sleeping boxes 10 in the uppermost row of the sleeping box arrangement 100 are not arranged so as to be offset in relation to the sleeping boxes 10 in the rows lying underneath them. As a result of this, the quick-action fastener elements 43 of the fastening apparatus 16 of the sleeping boxes 10 in the uppermost row of the sleeping box arrangement 100 interact with the quick-action fastener elements 42 of the fastening apparatus 16 of the sleeping boxes 10 in the middle row of the sleeping box arrangement 100, in order to fasten the sleeping boxes 10 in the uppermost row of the sleeping box arrangement 100 on the sleeping boxes 10 in the middle row of the sleeping box arrangement 100. Both the quick-action fastener elements 43 and the quick-action fastener elements 42 then also fulfil the function of connecting two sleeping boxes 10 which are laterally adjacent to one another, to one another. In other respects, the sleeping box arrangement 100 corresponds, as regards its structural configuration and its functionality, to the sleeping box arrangement 100 shown in FIGS. 1 to 5.

Figure 8:
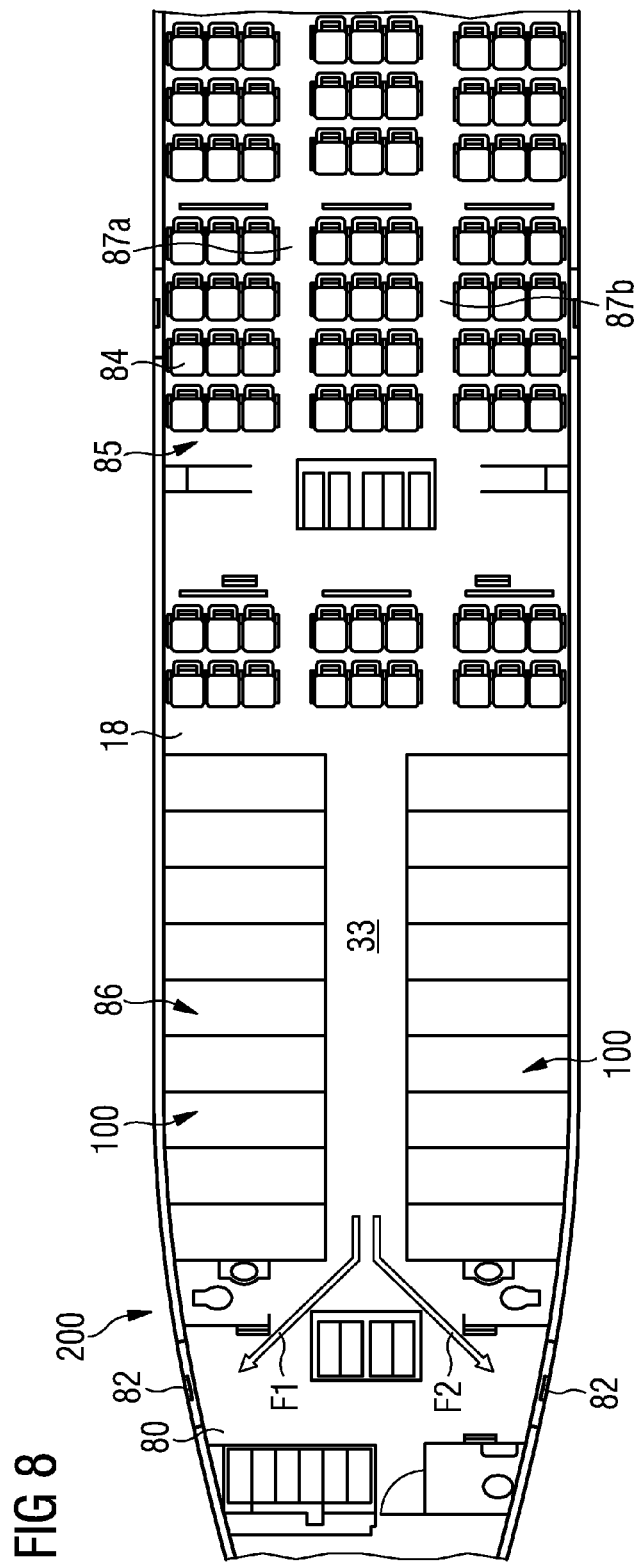
FIG. 8 shows a first embodiment of an aircraft area equipped with a sleeping box area.
Figure 9:
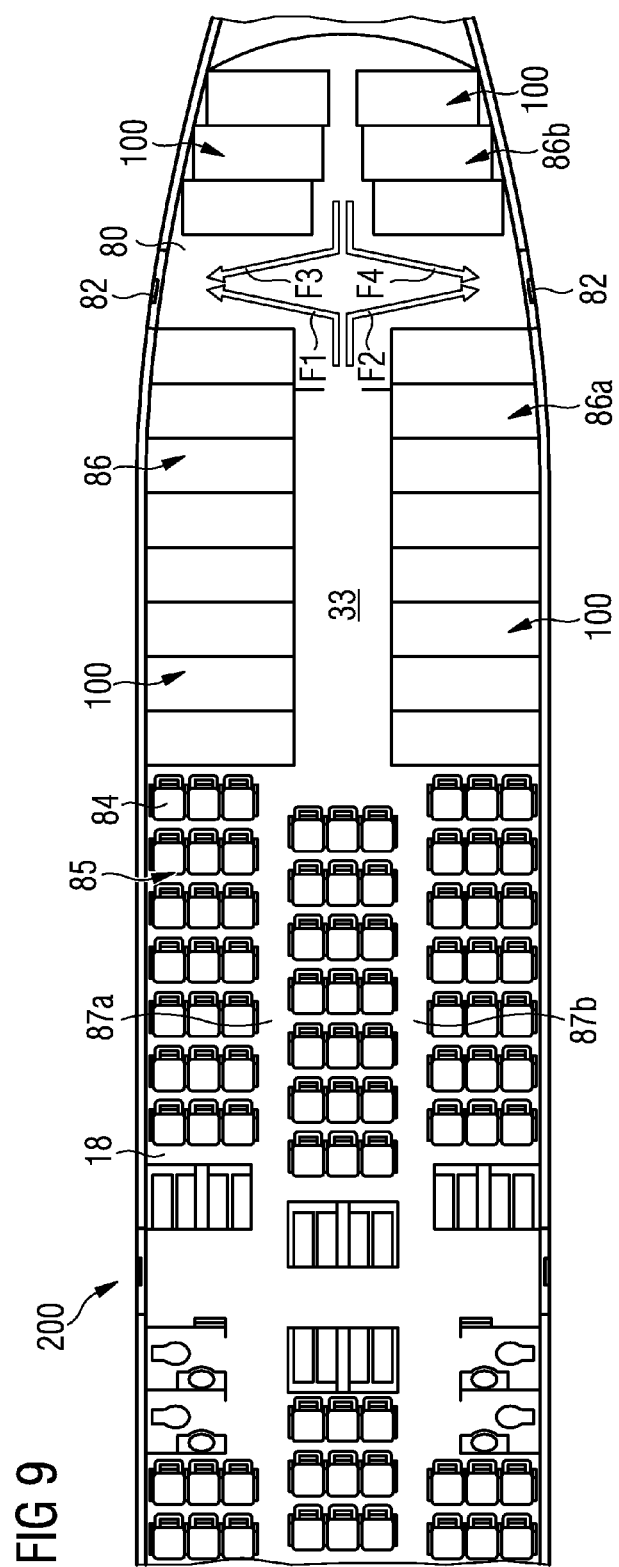
FIG. 9 shows another embodiment of an aircraft area equipped with a sleeping box area.

FIGS. 8 to 10 show various forms of embodiment of an aircraft area 200 within which a plurality of sleeping box arrangements 100, as shown in FIGS. 1 to 7, are set up. The aircraft area 200 forms part of the passenger cabin 18 of the aircraft and has an aisle 33 which extends along the longitudinal axis $L_P$ of the passenger cabin 18. Also provided within the aircraft area 200 is a door aisle 80 which extends perpendicularly to the longitudinal axis $L_P$ of the passenger cabin 18 and connects the aisle 33 to at least one aircraft door 82. In the forms of embodiment of an aircraft area 200 shown in FIGS. 8 to 10, the door aisle 80 connects the aisle 33 to each of two mutually opposite aircraft doors 82.

Provided within the aircraft area 200 is a passenger seating area 85 equipped with passenger seats 84, and also a sleeping box area 86. A number of sleeping box arrangements 100 are installed in the sleeping box area 86 in such a way that the longitudinal axis $L_G$ of the casing 12 of the sleeping boxes 10 of the sleeping box arrangements 100 extends perpendicularly to the longitudinal axis $L_P$ of the passenger cabin 18 in each case. The access aperture 14 of the casing 12 of all the sleeping boxes 10 borders on the aisle 33, so that the sleeping boxes 10 are conveniently accessible to passengers from the aisle 33. In contrast to the passenger seating area 85 equipped with seats, the sleeping box area 86 is equipped with just one aisle 33 which is flanked on both sides by sleeping box arrangements 100. On the other hand, the passenger seating area 85 equipped with seats has two main aisles 87a, 87b which extend along the longitudinal axis $L_P$ of the passenger cabin 18.

The sleeping box area 86 is constituted by an area of the passenger cabin 18 which extends over a desired length of the longitudinal axis $L_P$ of the passenger cabin 18, but which is not equipped with passenger seats 84 and is consequently devoid of passenger seats. In addition, the sleeping box area 86 in the arrangement according to FIG. 8 is connected to the aircraft doors 82, as is indicated by the arrows in FIG. 8, via escape routes F1, F2 which are not restricted by passenger seats 84, that is to say do not border on the passenger seating area 85. This permits quick and undisrupted evacuation of the sleeping box area 86 in an emergency. In particular, the sleeping box area 86 borders on the door aisle 80, so that passengers who are obliged to leave the sleeping boxes 10 within the sleeping box area 86 as quickly as possible in an emergency, can get to the aircraft doors 82 unhindered by passengers who are accommodated in the passenger seating area 85.

In the case of the aircraft area 200 illustrated in FIG. 8, the sleeping box area 86 is located in a front area of the passenger cabin 18, viewed in the direction of flight. In contrast to this, the sleeping box area 86 is arranged, in the case of the aircraft area 200 shown in FIG. 9, in a tail area of the aircraft. In the case of the aircraft area 200 according to FIG. 9, the sleeping box area 86 is divided up into two partial areas 86a, 86b which are located respectively in front of, and behind, the door aisle 80, viewed in the direction of flight of the aircraft. However, the two partial regions 86a, 86b of the sleeping box area 86 directly border on the door aisle 80 and are therefore connected to the aircraft doors 82 via escape routes F1, F2, F3, F4 which are each unrestricted by passenger seats 84.

The aircraft area 200 shown in FIG. 10 differs from the aircraft area 200 according to FIG. 9 through the fact that the sleeping box area 86, that is to say the partial sleeping box area 86a, extends further along the longitudinal axis $L_P$ of the passenger cabin 18 in the direction of a front area of the aircraft, so that the sleeping box area 86, that is to say the partial sleeping box area 86a, borders not only on the door aisle 80 located in a tail area of the aircraft but also on another door aisle 88 located in a central area of the aircraft. As a result of this, there are available to passengers accommodated in the sleeping boxes 10 six escape routes F1, F2, F3, F4, F5, F6, via which the passengers can get to the aircraft doors 82 or to other aircraft doors 90 without coming into contact with the passenger seating area 85.

As can be seen from FIG. 11, the aircraft area 200, as shown in FIGS. 8 to 10, may be supplemented by a freight compartment area 92 which is accommodated in a lower deck of the aircraft. As FIG. 12 shows, the freight compartment area 92 is connected to the passenger cabin 18 in the upper deck via an access 96 which may be designed in the form of a staircase or a lift. Accommodated within the freight compartment area 92 is at least one freight container 98, in the interior space of which at least one sleeping box 10 is provided. The freight container 98 may, for example, be configured in such a way that there is room for seven sleeping boxes 10 in its interior space. Each sleeping box 10 is suitable for accommodating one person, who is located in a reclining position parallel to a longitudinal axis $L_S$ of the sleeping box 10. The sleeping box 10 also has an access aperture 14 in the area of a front side which extends perpendicularly to the longitudinal axis $L_S$ of the sleeping box 10. The freight container 98 corresponds, as regards its shape and dimensioning, to a conventional freight container 100 and is consequently, just like a conventional freight container 100, suitable for being accommodated within the freight compartment area 92.

The sleeping boxes 10 provided in the freight container 98 may be equipped as described above. The freight container 98 within which the sleeping boxes 10 are accommodated is also of gastight design in order to permit the use of fire-extinguishing means within the freight compartment area 92 in the event of a fire. An aisle area 102 which is provided between mutually opposite sleeping boxes 10 within the freight container 98 is accordingly also of gastight design.

The freight compartment area 92 may be loaded, in a utilization-dependent manner, with freight containers 98, in the interior space of which sleeping boxes 10 are provided, and with conventional freight containers 100. As can be seen from FIG. 12, the freight containers 98, in the interior space of which sleeping boxes 10 are provided, are accommodated, viewed in a direction of loading L in which freight containers 98, 100 are brought into the freight compartment 94, in a rear part of the freight compartment area 92 which directly borders on the access 96 into the passenger cabin 18 in the upper deck. When the freight compartment area 92 is loaded, the freight containers 98 equipped with sleeping boxes 10 are consequently loaded in first, before the freight compartment area 92 is finally loaded with conventional freight containers 100. This guarantees unimpeded loading and unloading of the conventional freight containers 100.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft area having a passenger cabin, the passenger cabin comprising:
    an aisle which extends along a longitudinal axis of the passenger cabin;
    a door aisle which extends perpendicularly to the longitudinal axis of the passenger cabin and which connects to at least one aircraft door; and
    a sleeping box area within which a plurality of separate sleeping boxes are arranged side by side and one above another,
    wherein each sleeping box comprises:
        a casing suitable for accommodating a person located in a reclining position parallel to a longitudinal axis of the casing and which has an access aperture in an area of a front side which extends perpendicularly to the longitudinal axis of the casing; and
        a fastening apparatus configured to fasten the sleeping box such that the longitudinal axis of the casing extends perpendicularly to the longitudinal axis of the passenger cabin and the access aperture of the casing borders on the aisle,
    wherein each sleeping box is arranged such that the longitudinal axis of the casing extends perpendicularly to the longitudinal axis of the passenger cabin and the access aperture borders on the aisle, and
    wherein the plurality of sleeping boxes are arranged in three rows one above another, side walls of the casings of sleeping boxes which are positioned one above another in the upper two rows being arranged so as to be offset in relation to one another.

2. The aircraft area according to claim 1, wherein the fastening apparatus for at least one of the plurality of sleeping boxes is further configured to fasten the at least one sleeping box within a seating rail which is provided in a floor of the passenger cabin.

3. The aircraft area according to claim 1, wherein the fastening apparatus for at least one of the plurality of sleeping boxes is further configured to fasten the at least one sleeping box to a second sleeping box such that a floor of the casing of the at least one sleeping box borders on a ceiling of a casing of the second sleeping box.

4. The aircraft area according to claim 1, wherein the fastening apparatus for at least one of the plurality of sleeping boxes is further configured to connect the at least one sleeping box to at least one further sleeping box such that a side wall of the casing of the at least one sleeping box borders on a side wall of a casing of the at least one further sleeping box.

5. The aircraft area according to claim 1, wherein at least one of the plurality of sleeping boxes further comprises at least one of:
  at least one gripping recess which is formed in an inner face of at least one of the floor of the casing and a side wall of the casing, which inner face faces towards an interior space of the sleeping box;
  at least one grip rail which is fastened to an inner face of at least one of the ceiling of the casing and a side wall of the casing, which inner face faces towards the interior space of the sleeping box, and which grip rail extends, in particular, parallel to the longitudinal axis of the casing; and
  at least one gripping element which is fastened, to be displaceable parallel to the longitudinal axis of the casing, to at least one of the inner face of the ceiling of the casing which faces towards the interior space of the sleeping box and the grip rail.

6. The aircraft area according to claim 1, wherein, for at least one of the plurality of sleeping boxes:
  inner faces of at least one of the floor of the casing, the ceiling of the casing, a rear wall of the casing and side walls of the casing, which inner faces face towards an interior space of the sleeping box, are padded by cushioning;
  the sleeping box is equipped with an inflatable airbag which is configured to deploy in a direction of the interior space of the sleeping box if necessary; and
  the interior space of the sleeping box is designed so as to be devoid of edges and corners.

7. The aircraft area according to claim 1, wherein at least one of the plurality of sleeping boxes further comprises at least one of:
  a personal service unit having a plurality of service modules, which personal service unit is connected, via an interface element which is arranged in an area of an outer face of the casing to corresponding aircraft systems for supplying the service modules;
  a display screen connectable to an in-flight entertainment system; and
  an audio system which is connectable to the in-flight entertainment system.

8. The aircraft area according to claim 1, wherein a rear wall of the casing of at least one of the plurality of sleeping boxes is disposed opposite the access aperture and has a curvature which is adapted to a curvature of a passenger cabin wall at an intended site of installation of the sleeping box.

9. The aircraft area according to claim 1, wherein at least one of at least one rung and at least one handhold is attached, in the area of the access aperture, to at least one of an edge of a floor of the casing, of a ceiling of the casing and of a side wall of the casing of at least one the plurality of sleeping boxes.

10. The aircraft passenger cabin according to claim 1, wherein sleeping boxes which are arranged side by side in one row have the same length.

11. The aircraft area according to claim 1, wherein sleeping boxes which are arranged one above another have different lengths, the length of the sleeping boxes being, in particular, greater, the lower down the sleeping boxes are arranged.

12. The aircraft area according to claim 1, wherein the sleeping box area is constituted by an area of the passenger cabin which is devoid of passenger seats and which extends over a predetermined length along the longitudinal axis of the passenger cabin.

13. The aircraft area according to claim 1, wherein the sleeping box area is connected, via at least one escape route which is not restricted by passenger seats, to at least one aircraft door.

14. The aircraft area according to claim 1, wherein the sleeping box area borders on the door aisle.

15. The aircraft area according to claim 1, further comprising a freight compartment area which is connected to the passenger cabin via an access, there being accommodated within the freight compartment area at least one freight container, in an interior space of which there is provided at least one sleeping box which is suitable for accommodating a person located in a reclining position parallel to a longitudinal axis of the sleeping box, and which has an access aperture in the area of a front side which extends perpendicularly to the longitudinal axis of the sleeping box.

* * * * *